United States Patent

[11] 3,591,187

[72] Inventor Itsuki Ban
829, Higashi-Oizumimachi, Nerima-ku,
Tokyo-to, Japan
[21] Appl. No. 735,298
[22] Filed June 7, 1968
[45] Patented July 6, 1971
[32] Priority June 9, 1967
[33] Japan
[31] 42/36534

[54] ENDLESS TAPE CARTRIDGE PLAYER UTILIZING PLURALITY OF ENDLESS TAPE CARTRIDGES
10 Claims, 7 Drawing Figs.

[52] U.S. Cl. ........ 274/4, 179/100.2, 352/123
[51] Int. Cl. ........ B65h 19/00, G11b 15/66, G03b 21/04
[50] Field of Search ........ 242/198, 199, 200; 352/123, 78, 8; 179/100.2; 274/4 A—E

[56] References Cited
UNITED STATES PATENTS
3,127,178 3/1964 Osborne ...... 179/100.2

*Primary Examiner*—J. Russell Goudeau
*Attorney*—Nathan M. Briskin

ABSTRACT: An endless tape cartridge player utilizing a plurality of endless tape cartridges wherein a plurality of endless tape cartridges are received within a housing, the housing is rotated about a central shaft and caused to terminate its rotation to select a desired endless tape cartridge, and further the housing is moved along with the central shaft to bring the leading edge of the cartridge to be selected into a position opposite a tape reproduction arrangement which comprises a capstan and a magnetic head.

PATENTED JUL 6 1971

3,591,187

INVENTOR

ITSUKI BAN

BY [signature]

ATTORNEY

INVENTOR
ITSUKI BAN

BY [signature]

ATTORNEY

ENDLESS TAPE CARTRIDGE PLAYER UTILIZING PLURALITY OF ENDLESS TAPE CARTRIDGES

BACKGROUND OF THE INVENTION

The present invention relates to an endless tape player, and, more specifically, to an endless tape cartridge player utilizing a plurality of endless tape cartridges to automatically select the cartridge successively for playing the tape stored therein.

Much of the currently available tape players utilizing a plurality of endless tape cartridges to select one or more cartridges to play the tape are so designed that a capstan and a magnetic head are required to move into engagement with a pinch roller provided in the cartridge in order to play the tape. It has been, therefore, proposed to provide a swingable deck for the player carrying a capstan, magnetic head and other members whereby the tape reproduction arrangement is allowed to be held close to the cartridge to be selected. However, a disadvantage of the heretofore proposed player was that a spring was provided to act on the deck in order to secure engagement of the capstan with a pinch roller and consequently when the current would cut off during operation, the bias of the spring caused the capstan to be held close to the pinch roller for a long period and to thereby deform the pinch roller or to adhere the tape to the pinch roller. This causes backlash and breakage of the tape when current is again supplied. Another disadvantage of such player was that the player itself lost its stability and a good tone quality was hardly obtained.

Therefore, it has been desired to devise a player that can play a great number of tape cartridges in a manner that disc records can be played without requiring a complicated mechanism, and that the tape cartridges stored in the movable housing can be successively selected in the desired program.

SUMMARY OF THE INVENTION

It is a principal object of the invention, accordingly, to provide an endless tape cartridge player utilizing a plurality of endless tape cartridges wherein a cartridge receiving housing a rotatably mounted on a control shaft and is movable along with the shaft to move the cartridge to be selected close to a tape reproduction arrangement for playing the tape.

A further object of the invention is to provide an endless tape cartridge player utilizing a plurality of endless tape cartridges wherein a housing is normally positioned by spring means away from a tape reproduction arrangement and movement of the housing is arrested by a housing moving and driving means and electrically controllable housing return and arrest means for arresting movement of the housing, said housing moving and driving means being electrically controlled to move the housing against the bias of spring means to bring the cartridge to be selected into a position opposite a tape reproduction arrangement while moving the housing against spring means whereby the housing is moved away from the tape reproduction arrangement by bias of said spring even if current is cut off.

A further object of the invention is to provide an endless tape cartridge player utilizing a plurality of endless tape cartridges, which includes cartridge selector means adapted to automatically terminate rotation of a housing at a position where the selected cartridge is opposite a tape reproduction arrangement to thereby select the cartridge.

Another object of the invention is to provide an endless tape cartridge player utilizing a plurality of endless tape cartridges, which is provided with soundtrack changeover means effecting selection of a soundtrack as well as selection of the cartridge at the same time.

Still another object of the invention is to provide an endless tape cartridge player utilizing a plurality of endless tape cartridges, which is provided with cartridge selector means enabling a desired cartridge to be selected automatically in succession and performing tape reproduction.

Further objects and advantages of the invention will become apparent upon consideration of the specification and the following accompanying drawings, in which:

BRIEF DESCRIPTION OF THE DRAWING

Referring to FIG. 1, numeral 10 designates a cylindrical housing or casing having a plurality of openings $11_1$, $11_2$, $11_3$, ..., $11_8$ which are arranged in regularly and angularly spaced relationship therebetween. The housing 10 is secured through arms $12_1$, $12_2$, $12_3$, $12_4$ to a sleeve 13 supported on a central shaft 14. The openings $11_1$, $11_2$, ..., $11_8$ each includes a free end at one side of the housing 10 and a closed end at the other side thereof. Numerals $15_1$, $15_2$, ... $15_8$ indicate endless tape cartridges which are stored through associated openings $11_1$, $11_2$, ... $11_8$ within the housing 10 and of which the leading edges each project from one side of the housing 10. The central shaft 14 is rotatably supported by bearings 16 and 17, see FIG. 2, provided on a main body (not shown) and is adapted to rotate the housing 10 for selectively indexing a desired cartridge. Numeral 18 led by a dotted leading line, designates a disc, of which the details will be described when reference is made to FIG. 2, functioning as medium for selectively indexing a desired cartridge and a soundtrack.

FIG. 1 shows that a cartridge $15_4$ is selected to face a capstan 19 and a pinch roller 20 received within the associated cartridge is engageably pressed by the capstan which advances through a window (not shown) in the leading edge of the cartridge toward the inside thereof so that an endless tape (not shown) is in a running state. The capstan 19 is provided with a flywheel 21 between which and a shaft 23 of a motor 22 extends a belt 24 for imparting rotation of the motor 22 to the capstan 19. Since a driving system consisting of the capstan 19 is immovably provided within the main body, the housing 10 is required to slidably move along the central shaft 14 to allow the pinch roller 20 to engage the capstan 19. The detail of operation of these members will be described later.

Figure 1:
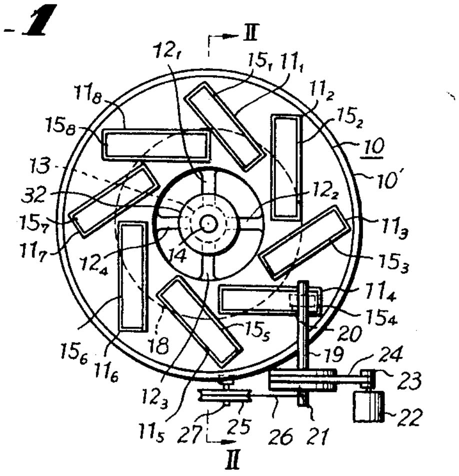
FIG. 1 is a schematic view showing a player housing having the invention embodied therein and a portion of a tape reproduction arrangement.

Numeral 25 denotes a belt wheel which is connected through a belt 26 to the capstan 19 and is rotatably supported by a shaft 27 of which one end is carried by a bearing (not shown) disposed of the main body. Frictional roller 28 made of resilient material such as rubber or the like is mounted on the other end of the shaft 27. The roller 28 is adapted to be positioned adjacent the travel path of the housing 10 and to engage a projection 10′ extending from the periphery of the housing 10 when the housing 10 is moved to be away from the capstan 19. With engagement of the projection 10′ with the roller 28, rotation of the roller is imparted to the housing 10 to rotate the same. On the contrary, when the housing 10 is moved toward the direction in which the capstan 19 is located, the housing 10 is released from its rotation due to disengagement of the roller 28 with the projection 10′. That is, during selection of the cartridge, rotation of the housing is effected and is arrested during tape running after selection of the cartridge.

Figure 3:
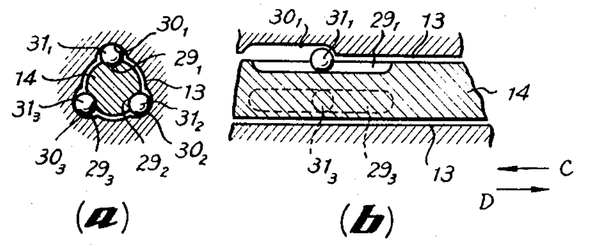
FIG. 3 is a sectional, enlarged view showing a housing sleeve and a central shaft for the purpose of explanation of their relationship.

The housing 10 is so adapted through the sleeve 13 on the central shaft 14 as to be slidably moved in the axial direction but not rotated in its horizontal plane. The structure of the shaft 14 in the detail is illustrated in FIG. 3. On the surface of midportion of the central shaft 14, it has equally spaced axially extending three grooves $29_1$, $29_2$, and $29_3$, in turn on the inside of the sleeve 13 there are provided three grooves $30_1$, $30_2$, and $30_3$ to correspond to those in the shaft 14. Disposed in these spaces between the sleeve 13 and the shaft 14, are steel balls or bearing members $31_1$, $31_2$, and $31_3$. As seen from the foregoing, the housing 10 may be slidable by means of the steel balls 31 in the direction of arrow C or D in relation to the central shaft 14. This enables the housing 10 to effect slidable movement smoothly. As shown in FIG. 3*a*, the width of each groove 30 is slightly larger than the diameter of each ball 31 so that the housing 10 may rotate in the direction of arrow E or F to a minimum extent but prevent itself from further rotation. Means for supporting the housing 10 is not limited within the aforementioned. For example, the sleeve 13 may be made of Teflon or the like having a slippery surface and a suitable retaining member may be interposed between such sleeve and the central shaft 14 in a manner that the central shaft 14 is slightly and angularly positioned with respect to the axial direction thereof.

Figure 2:
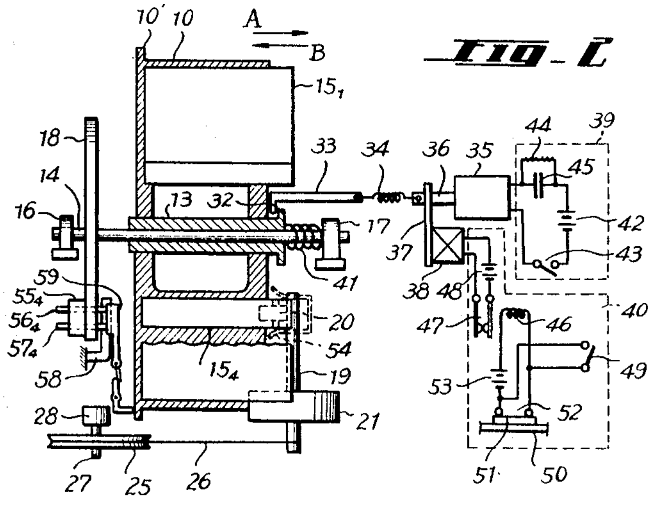
FIG. 2 is a view in vertical section take along the line II–II of FIG. 1, looking in the direction of the arrows, and showing the housing and a mechanism for initiating or arresting movement of the housing.

FIG. 2 is a section view taken along the line II–II of FIG. 1, wherein like parts are designated by like numerals. When the housing 10 is slidably moved in the direction of arrow A, the capstan 19 abuts against the pinch roller 20 in the cartridge $15_4$ to feed the tape. On the contrary, movement of the housing in the direction of arrow B keeps the capstan away from the cartridge $15_4$ to prevent the tape feed. Means is provided so that such movement of the housing is controlled, as will be in the detail described hereinafter.

Such means or a housing operating mechanism comprises a lever 33 engageable with a flange 32 formed of one end of the sleeve 13, an electromagnetic plunger 35 secured to the main body and which has an actuator 36 connectable through spring 34 to the lever 33, magnetically attracting means including an electromagnet 38 provided within the main body to correspond to a mild steel piece 37 mounted to the actuator 36 for the plunger 35, one electric supply circuit 39 for controlling current flow to the plunger 35, the other electric supply circuit 40 for controlling current flow to the electromagnet 38, and a spring member 41 wound about the shaft 14 to extend between the sleeve 13 and bearing 17. The circuit 39 is completed through a supply source 42 connected in series with an exciting coil (not shown) of the plunger 35, a switch 43 disposed between the exciting coil and the source 42, and a resistor 44 connected in parallel with a condenser 45. When the normally opened switch 43 is closed, a large current through the source 42 pulsatively flows to the exciting coil of the plunger 35 for the period of the time constant determined by the resistor 44 and the condenser 45. On the other hand, the circuit 40 includes an electromagnetic relay 46 and a supply source 48 is connected in series with the exciting coil (not shown) of the electromagnet 38 through relay terminals or contacts 47 of the relay 46. The exciting coil of the relay 46 is connected to a supply source 53 through the switch 49 of an endmark search head 52 of which contacts or terminals are short circuited by an endmark 51 made of conductive plate such as aluminum foil on the endless tape 50.

When the switch 43 is closed, the plunger 35 is pulsatively energized as mentioned to attract the actuator 36 to thereby slidably move the housing 10 by means of the spring 34, lever 33 and the flange 32 in the direction of arrow A against the bias of a spring 41. At the same time, the mild steel piece 37 secured to the actuator 36 is held closed to the open end of the yoke (not shown) of the electromagnet 38. As a result, the electromagnet 38 energized through the normally closed relay terminals 47 by the supply source 48 attracts the mild steel piece 37 to retain the actuator 36.

In this manner, if and when current to the coil 35 decays or is cut off by opening the switch 43 after the period of time constant determined by the resistor 44 and the condenser 45, the actuator may be maintained in position, as shown in FIGS. 1 and 2 in which the pinch roller 20 is forced closed to the capstan 19. In this state, the tape engages the magnetic head (not shown) provided on the main body and the endmark search head 52 and keeps on running to effect a desired reproduction.

When either the terminals of the endmark search head 52 are short circuited by the endmark 51 on the tape 50 or the switch 49 is manually closed, the electromagnetic relay 46 is energized to open the relay terminals 47 so that the electromagnet 38 is deenergized and demagnetized to release attraction of the mild steel piece 37. Accordingly, the housing 10 is moved in the direction of arrow B by the bias of the spring 41 and the cartridge $15_4$ moves away from the capstan 19 to terminate tape running. At the same time, the projection 10′ engages the frictional roller 28, the housing 10 is bodily rotated with the central shaft 14 to initiate selection of successive cartridge. In this manner, the cartridge to be selected is opposite the capstan 19, and the switch 43 is again closed in a manner described hereinafter so that the electromagnetic plunger 35 is energized to move the housing 10 in the direction of arrow A initiating tape running. Numeral 54 denotes a guide which clamps the leading edge of the cartridge to constantly hold a relative position of the capstan 19, magnetic head (not shown), and the cartridge to be selected when the pinch roller in the cartridge to be selected engages the capstan 19 by movement of the housing 10. This will improve the tone quality of reproduction sound.

Figures 4, 5, 6, 7:
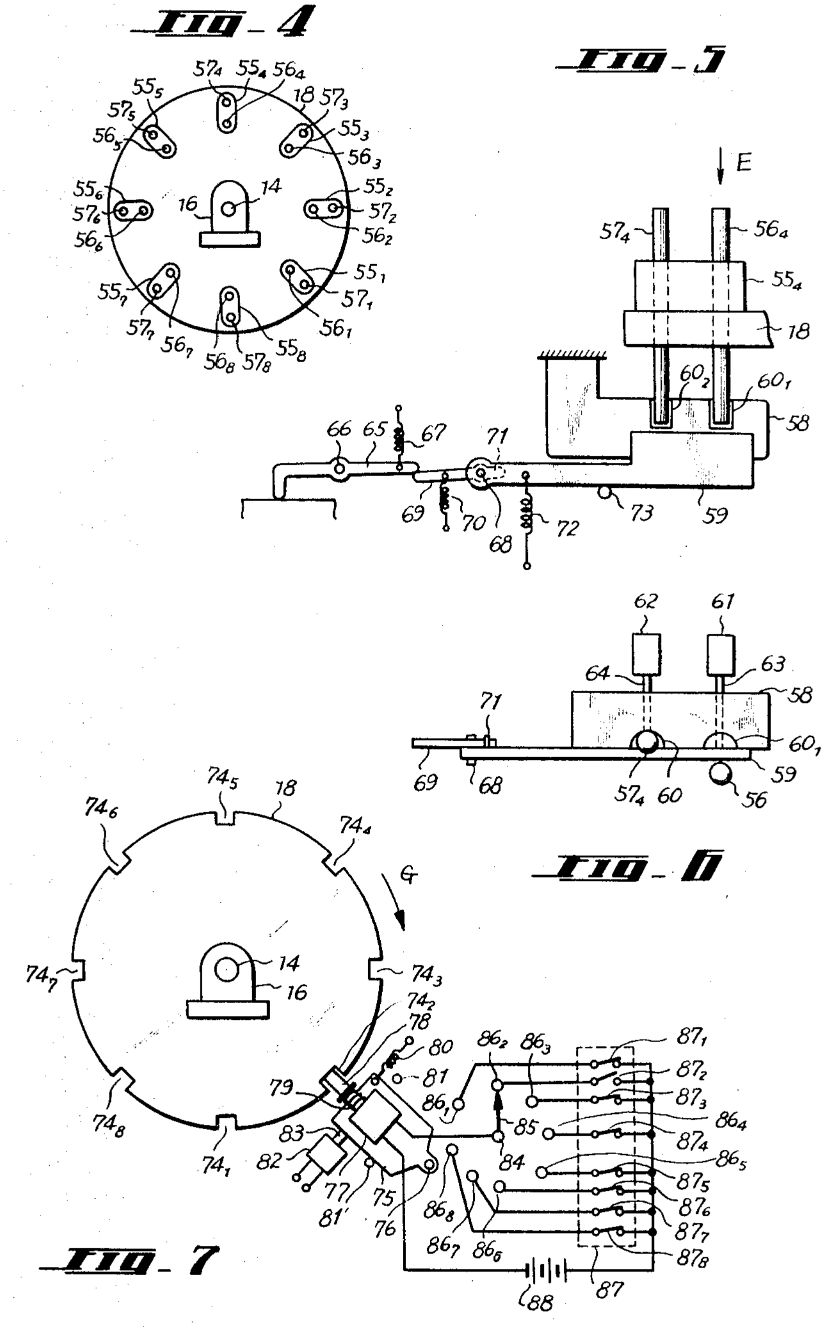
FIG. 4 is a schematic view showing a rotatable plate or disc shown in FIG. 1 and pushbutton rods arranged thereon.
FIG. 5 is an enlarged view showing the pushbutton rods shown in FIGS. 2 and 4 together with an arrest member and return mechanism therefor.
FIG. 6 is a schematic view of the pushbutton rods in connection with switches disposed on the arrest member.
FIG. 7 shows a modified form of a cartridge selector for use in the player according to the invention.

The disc or rotating plate 18 is provided, as shown in FIG. 4, with eight lugs $55_1$, $55_2$, ..., $55_8$ through which a pair of corresponding pushbutton rods $56_1$ and $57_1$; $56_2$ and $57_2$; ..., $56_8$ and $57_8$. FIG. 2 schematically shows only one lug $55_4$ and the corresponding pushrods $56_4$ and $57_4$. Numeral 58 designates an arrest member which arrests rotation of the housing 10 when the depressed button engages the member 58 in a manner described hereinafter and which is provided on the main body. Numeral 59 indicates a return lever which is swingably provided to return the depressed button rods to their initial position. Operation of the arrest member 58, return lever 59 and the pushbutton rods $56_4$ and $57_4$ in greater detail will be described referring to FIGS. 5 and 6.

Depression of the pushbutton rod $56_4$ downwardly in the direction of arrow E (FIG. 5) causes the button rod to slidably pass through the lug $55_4$ and to be held in position by frictional force. As clearly shown, the pushbutton rods $56_4$, $57_4$ are both depressed downwardly and frictionally held in position. The depressed pushbutton rod projecting from the rear side of the disc 18 may engage the arrest member 58 in the course of rotation of the disc 18 bodily with the housing 10 by means of the central shaft 14. The pushbutton rod coming into engagement with the arrest member 58 blocks rotation of the housing 10. On the other hand, the lower end of an undepressed button rod is positioned above the surface of the arrest member 58 while only a depressed button rod engages the arrest member 58.

Recesses $60_1$ and $60_2$ are formed on the surface of the arrest member 58 to receive the rods $56_4$ and $57_4$ when depressed. The pushbutton rods $56_4$ and $57_4$ are arranged in a manner as shown in FIG. 6 so that the latter rod $57_4$ is initially received within the recess $60_2$ to engage the arrest member 58 when they are depressed. Microswitches 61 and 62 comprise actuators 63 and 64 which pass through the arrest member 58 and of which ends are received within the recesses $60_1$ and $60_2$. When the pushrod $57_4$ is inserted into the recess $60_2$ to engage the arrest member 58, the actuator 64 of the microswitch 62 is depressed to change over the switch. The microswitch 62 includes a pair of switches, one being for changing over the soundtrack, the other one corresponding to the switch 43 as previously mentioned which is incorporated in the current supply circuit for the electromagnetic plunger 35. These two switches included in the microswitch 62 are closed by depressing the actuator 64. A first switch for changing over the second track (not shown) is disposed between a second pickup coil with which a first pickup coil is provided on the magnetic head (not shown) and which is opposite a second soundtrack on the tape and an amplifier (not shown). The second pickup coil may be connected to the first pickup coil when the first switch is closed. The second switch functioning as the switch 43 is closed to energize the electromagnetic plunger 35 causing the housing 10 to move in the direction of arrow A as viewed in FIG. 2 to effect engagement of the capstan 19 with the pinch roller 20 in the cartridge $15_4$ for tape running to initiate reproduction of the second soundtrack. Upon completion of reproduction of the second soundtrack, the terminals of the endmark search head 52 are short circuited by the endmark 51 to deenergize the electromagnet 38 causing the same to lose its attractive force to the mild steel piece 37. This allows the actuator 36 of the plunger 35 to release its retention and the housing 10 is moved under the influence of the spring 41 in the direction of arrow B. Thus, the capstain 19 moves away from the pinch roller 20 to terminate tape running.

When the housing 10 is moved in the direction of arrow B, one end of the lever 65 pivotally provided by a pin 66 is urged by a portion of the housing 10 against the bias of the spring 67 and is swung in the clockwise direction. The other end of the lever 65 engages one end of a lever 69 pivoted to a pin 68 carrying the lever 59 to swing the same about the pin 68. The lever 69 may swing independently of the return lever 59 about the pin 68 in the direction of arrow F against the bias of the spring 70, however, when clockwise rotation of the lever 65 is imparted to the lever 69 to allow it to swing in the reverse direction to that of arrow F, the lever 69 is swung with the return lever 59 since the other end of the lever 69 is held by a pin 71 projecting from the return lever 59. Thus, the return lever 59 is swung along with the surface of the arrest member 58 in the counterclockwise direction against the bias of the spring 72. This causes the depressed button rod $57_4$ to be raised and to move away from the arrest member 58. When the housing 10 is moved in the direction of arrow B by the bias of the spring 41 to the critical position, the one end of the lever 65 is away from the lever 69 and, therefore, the return lever 59 and the lever 69 continue their swing by the bias of the spring 72 in the clockwise direction until the return lever engages a pin 73. The bias force of the spring 70 is considerably weaker than that of the spring 73.

When the housing 10 is returned to its original position, it is rotated by engagement of the projection 10′ with the frictional roller 28 and next the pushbutton rod $56_4$ engages the arrest member 58 to arrest rotation of the housing 10. At the same time, the actuator 63 of the microswitch 61 is depressed by the pushbutton rod $56_4$ to effect changeover of the switch. The microswitch 61 which is similar to the other microswitch 62 includes a pair of switches, one being for changing over the soundtrack, the other corresponding to the switch 43 which is incorporated in the current supply circuit for the electromagnetic plunger 35. The first switch included in the microswitch 61 is disposed between a first pickup coil, as one of two coils, which is opposite a first soundtrack and an amplifier (not shown). Accordingly, when the microswitch 61 is operated by the pushbutton rod $56_4$, the first soundtrack on the tape is reproduced. On the other hand, closing of the second switch of the microswitch will energize the electromagnetic plunger 35 to move the housing 10 in the direction of arrow A causing the pinch roller 20 to be forced close to the capstan 19 so that tape running is effected and reproduction of the first soundtrack is initiated. When the housing 10 is moved in the direction of arrow A, the lever 65 which has been depressed by a portion of the housing 10 is returned by the bias of the spring 67 to its normal position. At this point, the lever 69 is caused to swing in the direction of arrow F against the bias of the spring 70, the one end of the lever 65 passes beyond the end of the lever 69 and in turn the lever is returned to its normal position as shown in FIG. 5.

When reproduction of the first soundtrack is completed, the endmark search head 52 is short circuited by the endmark 51 to deenergize the electromagnet 38 releasing retention of the actuator of the electromagnetic plunger 35 to thereby return the housing 10 to its normal position. As the housing 10 is returned, the return lever 59 is swing in the counterclockwise direction through the levers 65 and 69 to move the rod $56_4$ away from the arrest member 58. This causes the housing 10 to initiate and continue its rotation until the depressed pushbutton rod corresponding to the successive cartridge to be selected engages the arrest member 58. Cycle of operation is effected with respect to reproduction in the same manner as described hereinbefore.

FIGS. 5 and 6 show the pushbutton rods $56_4$ and $57_4$ which are both depressed to select two soundtracks. Operation of these button rods in detail is as described hereinbefore, however, from the foregoing it is apparent that one of the rods is depressed to play the corresponding soundtrack on the tape, for instance, depression of the rod $56_8$ plays the first soundtrack on the tape in the cartridge $15_8$ while depression of the other rod $57_2$ plays the second soundtrack on the tape in the cartridge $15_2$. In case there has been provided the tape having four tracks thereon, four pushbutton rods and the corresponding parts are required to this end. As clearly illustrated, a desired cartridge and soundtrack are selected by depressing the corresponding pushbutton rod.

The recesses $60_1$ and $60_2$ are indispensable members to effect swing of the return lever 15 by means of the actuators 63 and 64 of the corresponding microswitches 61 and 62 respectively.

The switch 43 shown in FIG. 2 is held closed during tape reproduction, however, current through the high resistor 44 to the exciting coil of the plunger 35 is considerably minimized after passing time constant which is determined by the resistor 44 and the condenser 45 so that current consumption of the electromagnetic plunger 35 is accordingly small.

In a preferred embodiment of the invention, the cartridges $15_1$, $15_2$, ..., $15_8$ are constructed such that the housing 10 is moved therewith to select and play a desired cartridge so that the cartridges are not required to independently move. This arrangement enables the player to be constructed compactly and solidly. Further, the electromagnetic plunger 35 is so adapted to operate against the bias of the spring 41 to effect engagement of the capstan 19 with the pinch roller that there is no tape troubles such as backlash, breakage and no deformation of the tape if unexpected breakdown of current is caused. This is entirely due to the fact that the punch roller 20 may be automatically moved away from the capstan 19 whether or not current is supplied.

The above embodiment is directed to a player employing a cartridge selector for selecting a desired cartridge by engaging a pushbutton rod opposite and corresponding to each cartridge with the arrest member. Another form of modified cartridge selector is shown in FIG. 7 in which like parts are denoted by like numerals.

Numeral 18′ designates a disc or rotatable plate which is similar to the disc 18 shown in FIG. 2 except that the periphery thereof is provided with notched portions $74_1$, $74_2$, ... $74_8$ in regular spaced relationship. Each of the notched portions is arranged to correspond to each of the cartridges. Provided adjacent the periphery of the disc 18, is support plate 75 of which one end is mounted by a pin 76 to the main body and on which is mounted an electromagnetic plunger 77 having an actuator 78 engageable with one of the notched portions $74_1$, $74_2$, ... $74_8$. The actuator 78 projects from the support plate by the biasing of the spring 79 so that it may be inserted into any one of the notched portions when the plunger 77 is deenergized. The support plate 75 is swingable in the clockwise direction by the bias of the spring 80, however, its further rotation is arrested by a stopper 81. Provided adjacent the range of rotation of the support plate 75 is a microswitch 82 having an actuator 83 which is depressible by the support plate 75.

The microswitch 82 is similar to the switch 43 shown in FIG. 2 and of which terminals are closed when the actuator 83 is depressed. When the electromagnetic plunger 35 (see FIG. 2) is energized, the housing 10 is moved in the direction of arrow A to initiate tape running for reproduction. Numeral 81 denotes a stopper which arrests rotation of the support plate 75 at a position where the actuator 83 is operated by the support plate 75 and the terminals are closed. The electromagnetic plunger 77 synchronizes with the disc 18' and is connected to a supply source 88 through a rotary switch 84 having a slidable contact 85 and eight sets of one by one selectable switches 87 which includes switch contacts $87_1$, $87_2$, ..., $87_8$ connected to fixed contacts $86_1$, $86_2$, ..., $86_8$ of the rotary switches 84. The disc 18' and the rotary switch 84 are in a predetermined position with respect to each other so that when the notched portions $74_1$, $74_2$, ... $74_8$ each is opposite the actuator 78, the slidable contact 85 of the rotary switch 84 may engage each of the fixed contacts $86_1$, $86_2$, ..., $86_8$. The switch contacts $87_1$, $87_2$, ..., $87_8$ of the one by one selectable switch 87 are provided with indications (not shown) each corresponding to each of the cartridges received in the housing. The switch contact is only depressed to correspond to a desired cartridge to be played allowing that switch to be opened but the others are held closed. As shown in FIG. 7, the switch contact $87_2$ is depressed and held open. At a position where the slidable contact 85 of the rotary switch 84 engages the fixed contact $86_2$, the electromagnetic plunger 77 is deenergized to return the attracted actuator 78 to its normal position by the bias of the spring 79 allowing the actuator 78 to be inserted into the notched portion $74_2$ so that rotation of the disc 18' is arrested. Since the disc 18' is rotated in the direction of arrow G, when the actuator 78 engages the notched portion $74_2$, the electromagnetic plunger 77 is swung with the support plate 75 towards microswitch 82 to operate the microswitch 82. As mentioned hereinbefore, the microswitch 82 is similar to the switch 43 shown in FIG. 2 so that the electromagnetic plunger 35 is energized and the housing 10 is moved in the direction of arrow A to play the cartridge $15_2$ corresponding to the switch contact $87_2$. Next, the switch contact $87_6$ is depressed, the switch contact $87_2$ which has been closed is accordingly held closed, the electromagnetic plunger 77 is energized to attract the actuator 78 against the bias of the spring 79 to allow the actuator 78 to be away from the notched portion $74_2$ to thereby release retention of rotation of the disc 18'. Thereafter, manual depression of the switch 49 shown in FIG. 2 releases retention of the housing 10 by means of the electromagnet 38 to move the housing 10 in the direction of arrow B causing the housing to engage the frictional roller 28 and to be rotated. When rotation of the housing 10 is going on, at a position where the successive notched portion $74_3$ is opposite the actuator 78, the slidable contact 85 is connected to the fixed contact $86_3$ whereas the switch contact $87_3$ is closed, so that the electromagnetic plunger 77 is energized not to effect retention of rotation of the disc 18'. When the successive notched portions $74_4$ and $74_5$ are opposite the actuator 78, rotation of the housing 10 is not arrested for the reason as mentioned hereinbefore. At a position where the actuator 78 is opposite the notched portion $74_6$, the slidable contact 85 is connected to the fixed contact $86_6$, on the other hand, the actuator 78 is not attracted since the switch contact $87_6$ is opened so that the actuator 78 is inserted into the notched portion $74_6$ by the bias of the spring 79 to arrest rotation of the housing 10. At the same time, the actuator is urged in the direction of arrow G to rotate the support plate 75 in the counterclockwise direction. This operates the microswitch 82 to open its terminals and in turn rotation of the support plate is arrested by a stopper 81'. In the manner as described in the above, the housing 10 is moved in the direction of arrow A to initiate tape production in the cartridge $15_6$.

As clearly from the foregoing, tape reproduction is effected by depressing the contacts $87_1$, $87_2$, ....., $87_8$ in succession as desired to select the corresponding cartridge. In the embodiment shown in FIG. 7, an endmark search head circuit corresponding to that shown in FIG. 2 is not illustrated. According to the embodiment shown in FIG. 7, the cartridge may be selected by remote control from a distance if the wire of circuit for the one by one selectable switch 87 is lengthened to such the extent. For instance, the main body is received with the car trunk while the cartridge is selected at the driver's seat to play the tape.

Instead of the notched portion $74_1$, $74_2$....., $74_8$, suitable projections may be provided on the periphery of the disc 18'. The notched portions may be provided with the housing 10 without mounting the disc 18' on the housing 10.

The illustrative embodiments described above and shown in the drawing are obviously susceptible of modification in form within the scope of the appended claims. For example, instead of using the above means for initiating or arresting movement of the housing, conventional means might be employed.

What I claim is:

1. An automatic playing apparatus utilizing a plurality of endless tape cartridges comprising a housing rotatable about a central shaft and adapted to be slidably moved along the central shaft, said housing being adapted to radially store a plurality of endless tape cartridges in a manner that the leading edges of the cartridges extend outwardly; spring means connected to said housing to urge the housing towards a rotating position; electrically controlled housing driving means for slidably moving the housing along the central shaft against the bias of said spring means from the rotating position to a play position; electrically controlled housing return arresting means for arresting the movement of the housing imparted to the housing by said housing driving means and located in the path of movement of the housing; a tape reproduction arrangement adapted to be disposed opposite one of a plurality of endless tape cartridges stored within the housing when the housing is retained by said housing return arresting means and including a capstan engageable with a pinch roller in said cartridge, capstan driving means, and a magnetic head engageable with the endless tape; housing rotation means for rotating the housing when the housing is returned by the spring means to the rotating position; and cartridge selector means having a plurality of stop members mounted for synchronous rotation with the housing and corresponding to the plurality of endless tape cartridges stored in the housing, and an arrest member adapted to be engaged by a stop member; whereby rotation of the housing is arrested by engagement of a stop member with the arrest member to bring the endless tape cartridge corresponding into a position opposite the tape reproduction arrangement; said housing driving means comprises a lever coupled to the housing, an electromagnetic plunger having an actuator connected to said lever, and a current supply circuit for said electromagnetic plunger; said housing return arresting means includes a mild steel piece secured to the actuator of the electromagnetic plunger, an electromagnet arranged to magnetically attract said mild steel piece and a current supply circuit for said electromagnet; and said housing rotation driving means comprises a transmission mechanism to transmit rotating force of the capstan on the tape reproduction arrangement, and a frictional roller located at a position where the housing is returned by the bias of said spring means, said roller engaging said housing at said position to effect rotation of the housing through said transmission mechanism.

2. An endless tape player utilizing a plurality of endless tape cartridges in accordance with claim 1 wherein said cartridge selector means includes a switch adapted to be closed when the stop member engages the arrest member, current supply to said housing driving means being controlled by said switch, whereby as engagement of the stop member with the arrest member is established the housing is slidably moved along the central shaft to allow the selected cartridge to be opposite the tape reproduction arrangement to thereby effect tape reproduction.

3. An endless tape player utilizing a plurality of endless tape cartridges comprising a housing rotatable about a central shaft and adapted to be slidably moved along the central shaft, said housing being adapted to radially store a plurality of endless tape cartridges in a manner that the leading edges of the cartridges extend outwardly, spring means connected to said housing to urge the housing towards a rotating position; electrically controlled housing driving means for slidably moving the housing along the central shaft against the bias of said spring means from the rotating position to a play position; electrically controlled housing return arresting means for arresting the movement of the housing imparted to the housing by said housing driving means and located in the path of movement of the housing; a tape reproduction arrangement adapted to be disposed opposite one of a plurality of endless tape cartridges stored within the housing when the housing is retained by said housing return arresting means and including a capstan engageable with a pinch roller in said cartridge, capstan driving means, and a magnetic head engageable with the endless tape; housing rotation means for rotating the housing when the housing is returned by the spring means to the rotating position; and cartridge selector means having a plurality of stop members mounted for synchronous rotation with the housing and corresponding to the plurality of endless tape cartridges stored in the housing, and an arrest member comprising an electromagnetic plunger having an actuator engageable by a stop member; a current supply circuit comprising one by one selectable switches having a plurality of switch contacts each corresponding to each of the endless tape cartridges stored in the housing, slidable contacts rotatable synchronously with said housing, and a rotary switch having fixed contacts each connected to each of the one by one selectable switches, the endless tape cartridge to be played being indexed by depressing the switch contact of said one by one switch, means for terminating current supply to the electromagnetic plunger responsive to depressing said switch when the stop member of the cartridge selector means corresponding to the endless tape cartridge is opposite the actuator of said electromagnetic plunger, whereby rotation of the housing is arrested by engagement of the actuator with the stop member to allow the selected cartridge to be opposite said tape reproduction arrangement.

4. An endless tape player utilizing a plurality of endless tape cartridges in accordance with claim 3 wherein said housing driving means comprises a lever connected to the housing, an electromagnetic plunger having an actuator connected to said lever, and a current supply circuit for said electromagnetic plunger; said housing return arresting means includes a mild steel piece secured to the actuator of the electromagnetic plunger, an electromagnet arranged to magnetically attract said mild steel piece and a current supply circuit for said electromagnet; and said housing rotation driving means comprises a transmission mechanism to transmit rotating force of the capstan on the tape reproduction arrangement, and a frictional roller located at a position where the housing is returned by the bias of said spring means, said roller engaging said housing at said position to effect rotation of the housing through said transmission mechanism.

5. An endless tape player utilizing a plurality of endless tape cartridges in accordance with claim 3 wherein said cartridge selector means includes a switch adapted to be closed when the stop member engages the arrest member, current supply to said housing driving means being controlled by said switch, whereby as engagement of the stop member with the arrest member is established the housing is slidably moved along the central shaft to allow the selected cartridge to be opposite the tape reproduction arrangement to thereby effect tape reproduction.

6. An endless tape player utilizing a plurality of endless tape cartridges comprising a housing rotatable about a central shaft and adapted to be slidably moved along the central shaft, said housing being adapted to radially store a plurality of endless tape cartridges in a manner that the leading edges of the cartridges extend outwardly; spring means connected to said housing to urge the housing towards a rotating position; electrically controlled housing driving means for slidably moving the housing along the central shaft against the bias of said spring means from the rotating position to a play position; electrically controlled housing return arresting means for arresting the movement of the housing imparted to the housing by said housing driving means and located in the path of movement of the housing; a tape reproduction arrangement adapted to be disposed opposite one of a plurality of endless tape cartridges stored within the housing when the housing is retained by said housing return arresting means and including a capstan engageable with a pinch roller in said cartridge, capstan driving means, and a magnetic head engageable with the endless tape; housing rotation means for rotating the housing when the housing is returned by the spring means to the rotating position; and cartridge selector means having a plurality of stop members mounted for synchronous rotation with the housing and corresponding to the plurality of endless tape cartridges stored in the housing, and an arrest member adapted to be engaged by a stop member; whereby rotation of the housing is arrested by engagement of a stop member with the arrest member to bring the endless tape cartridge corresponding into a position opposite the tape reproduction arrangement; said stop members being a plurality of pushbutton rods slidably disposed on a rotatable plate which is secured to the central shaft of said housing, said pushbutton rods being adapted to be depressed from a normal position to an indexing position indexing the cartridge to be played and to be frictionally retained in the indexing position, the arrest member is provided with a switch for controlling current supply to the housing driving means, and said switch is closed by the depressed pushbutton rod engaging said arrest member.

7. An endless tape player utilizing a plurality of endless tape cartridges in accordance with claim 6 wherein mounted adjacent the arrest member of said cartridge selector means and adjacent to the position where the end of a depressed pushbutton rod engages the arrest member is a return lever which is adapted to swing with respect to sliding movement of the housing along said central shaft, and pushbutton rod return means is provided at a position where the housing moves away from said tape reproduction arrangement for allowing said return lever to move a depressed pushbutton rod engaged with the arrest member out of engagement with the arrest member.

8. An endless tape player utilizing a plurality of endless tape cartridges in accordance with claim 7 wherein said tape reproduction arrangement is provided with an endmark search head for detecting an endmark on the tape and being engageable with the endless tape in the endless tape cartridge, means responsive to the detection of the endmark for controlling current supply to said housing return arresting means and for terminating actuation of said housing return arresting means when the endmark is detected by said endmark search head, whereby the housing is automatically returned to its normal position by the bias of said spring means when the endmark is detected.

9. An endless tape cartridge player utilizing a plurality of endless tape cartridges in accordance with claim 7 wherein the magnetic head of the tape reproduction arrangement has a plurality of pickup coils corresponding to the soundtracks of the tape, said housing is angularly disposed on the central shaft to give a certain free rotation angle, a cartridge guide is mounted on said tape reproduction arrangement for gripping the leading edge of the endless tape cartridge, the pushbutton rods of said cartridge selector means being a series of sets of rods corresponding to the number of soundtracks on the tape, each series of sets of rods to connect said output to an amplifier.

10. An endless tape player utilizing a plurality of endless tape cartridges in accordance with claim 9 wherein said tape reproduction arrangement is provided with an endmark search head for detecting an endmark on the tape and being engageable with the endless tape in the endless tape cartridge, means responsive to the detection of the endmark for controlling current supply to said housing return arresting means and for terminating actuation of said housing return arresting means when the endmark is detected by said endmark search head, whereby the housing is automatically returned to its normal position by the bias of said spring means when the endmark is detected.